INVENTOR:
WILLIAM M. PRICE,
BY
McMorrow, Berman + Davidson
ATTORNEYS.

June 9, 1953    W. M. PRICE    2,641,483
PARALLEL TWIN-FLEX SPRING SUSPENSION
FOR TWO-WHEELED VEHICLES
Filed Nov. 10, 1950    2 Sheets-Sheet 2
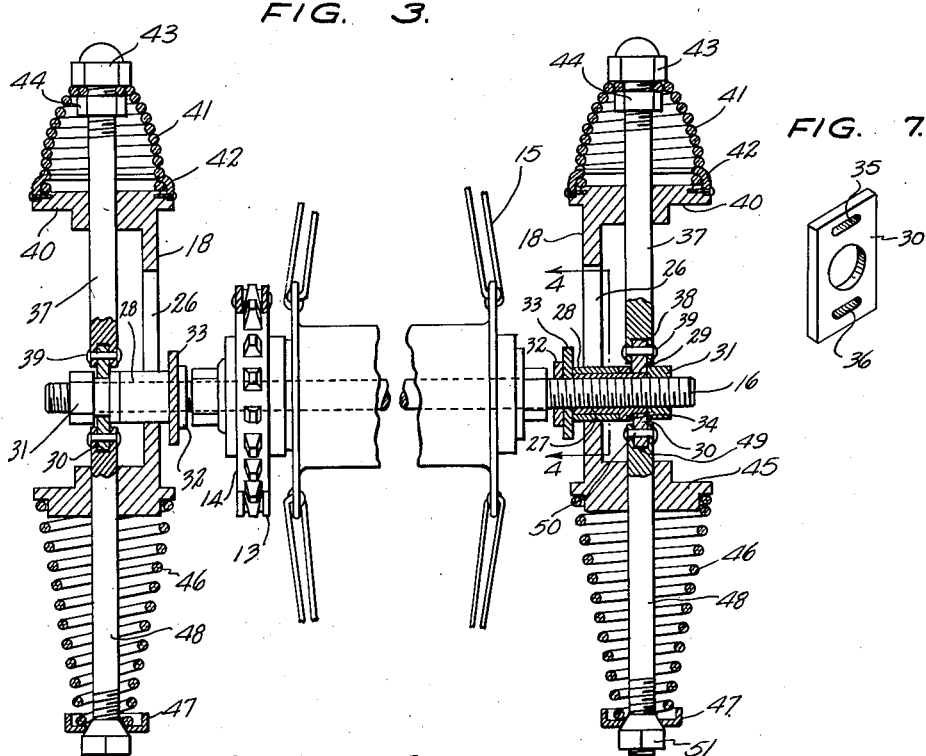
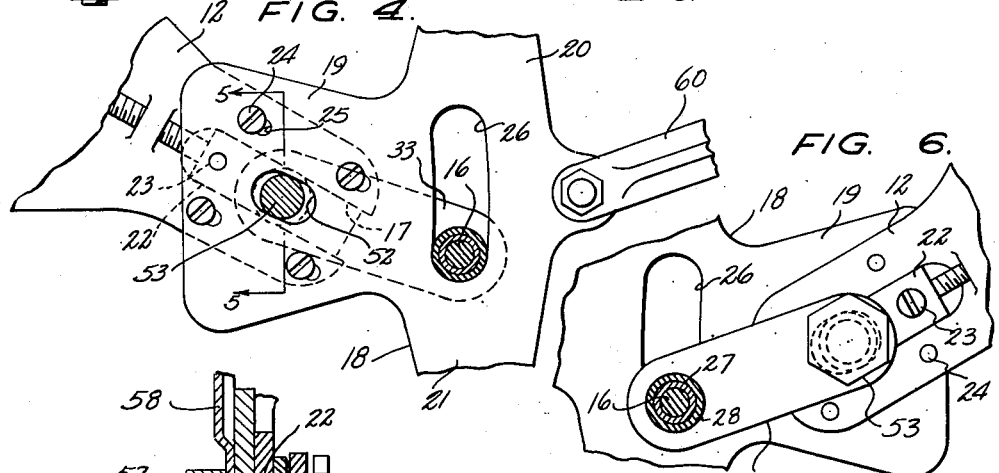
INVENTOR.
WILLIAM M. PRICE,
BY
McMorrow, Berman + Davidson
ATTORNEYS.

Patented June 9, 1953

2,641,483

UNITED STATES PATENT OFFICE 2,641,483

PARALLEL TWIN-FLEX SPRING SUSPENSION FOR TWO-WHEELED VEHICLES

William M. Price, Towson, Md.

Application November 10, 1950, Serial No. 195,022

3 Claims. (Cl. 280—285)

This invention relates to spring suspension structures for two-wheeled vehicles, such as bicycles and the like, and more particularly to an improved spring suspension for the rear wheel of a bicycle.

A main object of the invention is to provide a novel and improved spring suspension for the rear wheel of a bicycle or similar vehicle, said suspension providing greatly increased comfort in riding the vehicle, increasing the life and durability of the associated parts of the vehicle by absorbing road shocks, and being relatively simple to install.

A further object of the invention is to provide an improved twin spring suspension for the rear wheel of a two-wheeled vehicle, such as a bicycle, said suspension being simple in construction, involving relatively few parts, being very durable, and providing efficient cushioning of the vehicle frame with respect to the rear wheel thereof without allowing the sprocket chain of the bicycle to become excessively loosened during the movements of the frame with respect to the rear wheel resulting from road shocks.

Further objects and advantages of the invention will become apparent from the following description and claims, and from the accompanying drawings, wherein:

Figure 3 is an enlarged, cross-sectional, detail view taken on line 3—3 of Figure 1;

Figure 4 is a fragmentary, cross-sectional, detail view taken on line 4—4 of Figure 3;

Figure 5 is a cross-sectional, detail view taken on line 5—5 of Figure 4;

Figure 6 is an enlarged, cross-sectional, detail view taken on line 6—6 of Figure 2;

Figure 7 is an enlarged, perspective, detail view of the suspension link bar connecting plate employed in the spring suspension structure of Figures 1 to 6.

Figure 1:
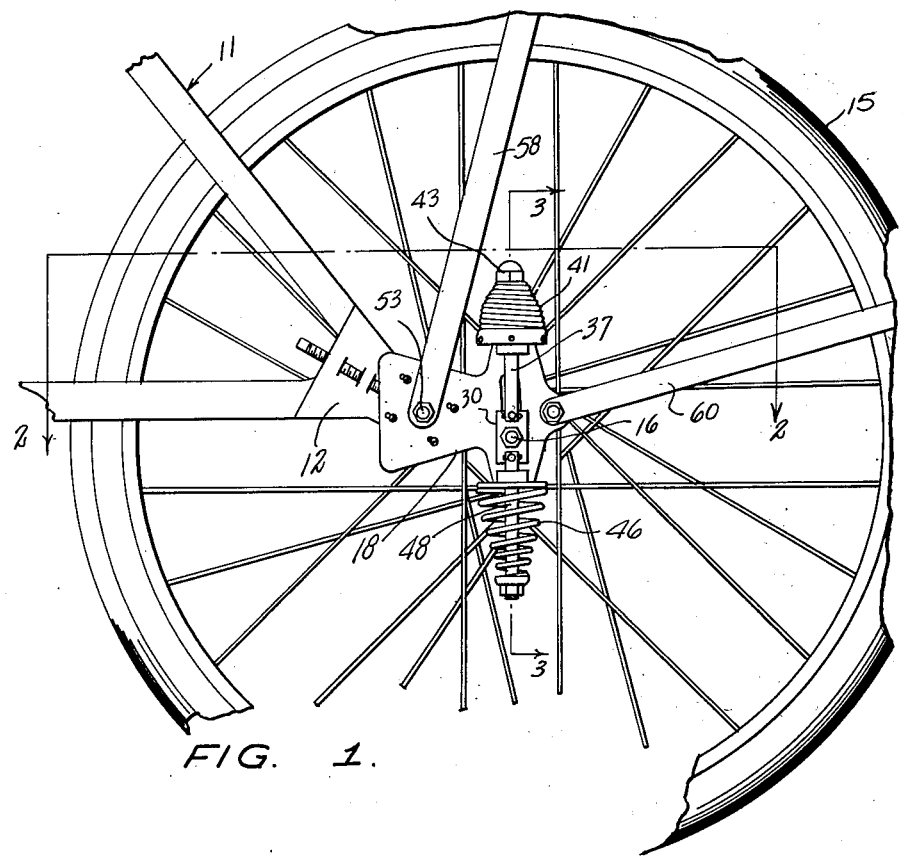
Figure 1 is a fragmentary side elevational view of the rear portion of a bicycle equipped with an improved rear wheel spring suspension structure according to the present invention.

Referring to the drawings, 11 generally designates the frame of a bicycle of standard construction, said frame having the usual rear fishtails 12. The bicycle has the usual sprocket chain 13 whose forward portion is engaged on the sprocket carried by the shaft of the pedal crank, not shown, and whose rear portion is engaged on a sprocket 14 coaxially secured to the rear wheel 15 of the bicycle. Designated at 16 is the rear axle on which wheel 15 is journaled.

Figure 2:
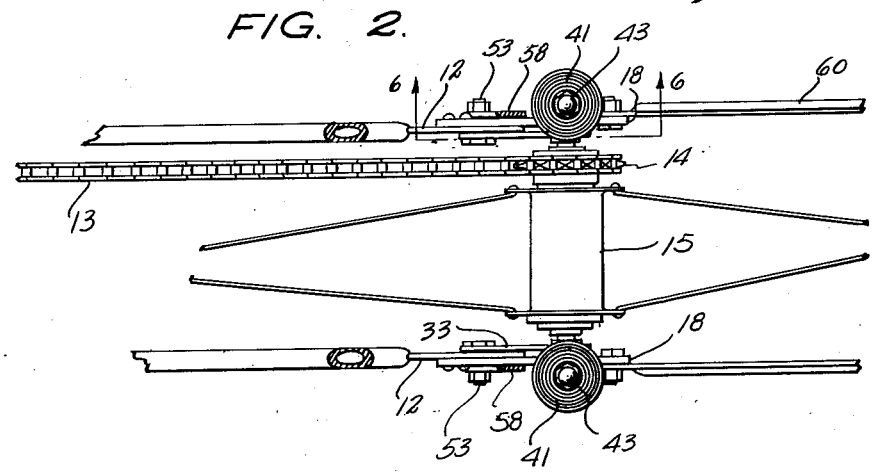
Figure 2 is a cross-sectional view taken on line 2—2 of Figure 1.

Each fishtail 12 is formed with the usual inclined, open-ended slot 17. Designated at 18 is a vertical bracket member having the forwardly extending, main body portion 19, the upstanding arm portion 20 and the depending arm portion 21. Identical bracket members 18 are provided on opposite sides of the rear wheel 15, as shown in Figure 3, said bracket members being oppositely turned so as to face outwardly, as shown. As shown in Figure 2, there are respective fishtail portions 12 disposed on opposite sides of the rear wheel 15, and each bracket 18 is secured to one of the fishtail portions. Secured to the main body 19 of each bracket member 18 is a block member 22 which is fastened to the body 19 by a suitable fastener, such as a machine screw 23, said block member being received in the slot 17 of the associated fishtail member 12. The body 19 is fastened to the fishtail member by screws or bolts 24 passing through slots 25 in the body 19 and engaging in the respective arms of the fishtail 12 on opposite sides of the slot thereof. Designated at 26 is an arcuate slot formed in the bracket member 18, said slot having a radius extending in the same direction as the sprocket chain 13 and being substantially equal in length to the distance between the axis of the pedal crank and that of the axle 16. As shown in Figures 3 and 4, the axle 16 extends through the slots 26 in the respective bracket members 18 and is vertically movable therein, as viewed in Figures 3 and 4. The ends of the axle 16 are threaded, and secured thereon is a sleeve member 27 on which is rotatably mounted a sleeved roller 28 which rolls freely in the slot 26. The outer end portion of each sleeve member 27 is formed with an annular bearing seat 29 on which is rotatably mounted a plate member 30, a nut 31 being engaged on the end of the axle 16 which cooperates with an inner nut 32 to lock the sleeve member 27 to the axle. Locked between the sleeve member 27 and the nut 32 is an arm 33. Designated at 34 is an annular flange on the sleeve member 27, the roller 28 being freely rotatable on the sleeve 27 between the flange 34 and the arm 33. The space between the nut 31 and the flange 34 is sufficient to allow free rotation of the plate member 30 around the axis of the sleeve 27.

Each of the plate members 30 is formed with the upper and lower, horizontally extending slots 35 and 36. Designated at 37 is an upstanding link bar or rod formed at its bottom end with a notch 38 straddling the top end of the plate member 30 and movably secured to said plate member by a rivet 39 extending through the slot 35 and through the opposing leg portions of the notched end of the rod. The top end of each arm 20 of the bracket members 18 is formed with a centrally apertured boss 40 through which the rod 37 slidably passes. Designated at 41 is an upwardly tapering, helically coiled, extensible spring whose lower end is secured on the boss 40 by a flanged ring member 42 secured to the boss 40, as shown in Figure 3. The top end of the spring 41 is clamped between a cap nut 43 on the top end of the rod 37 and a lock nut 44 engaging on the rod below the top turn of spring 41, as shown in Figure 3. Spring 41 is extensible in response to upward movement of rod 37 relative to the bracket member 18. The depending arm 21 of each bracket member 18 is formed at its lower end with a boss 45 which is formed to define a seat for the upper end of a compressible, downwardly tapering, coiled spring 46, the lower end of said spring being received in an annular cup member 47. Designated at 48 is a second depending link or rod member secured to the lower end of the plate 30, the top end of rod member 48 being formed with a notch 49 which receives the lower end of plate member 30 and said top end being secured to the lower end of the plate member 30 by a transverse rivet 50 extending through the slot 36 and through the respective legs of the top end of rod 48 on opposite sides of the notch 49. Threaded on the lower end of the rod 48 is a nut 51 which supports the annular cup member 47. It will be apparent that the spring 46 will be compressed in response to upward movement of the rod 48 relative to the bracket member 18. As in the case of the boss 40, the boss 45 is formed with a central aperture through which the rod 48 slidably extends, allowing free, vertical movement of the rod member 48 with respect to the boss 45.

From the foregoing, it will be apparent that downward deflection of the frame 12 relative to the wheels 15 will be cushioned by the extension of the springs 41 and by the compression of the springs 46 on opposite sides of the wheel 15. In order to accurately maintain parallelism of the bracket members 18, 18 with respect to the plane of the wheel 15 during reciprocation of the axle 16 in the slots 26, the link arms 33 are provided on the axle 16 which are locked between the sleeve members 27 and the nuts 32. The forward end of each arm 33 is formed with a slot 52, and designated at 53 is a transverse bolt member which extends through the slot 52 and movably connects the arm 33 to the body portion 19 of bracket member 18. As shown in Figure 5, the bolt 53 is formed with an enlarged bearing portion 54 engaging in the slot 52 and defining a shoulder at 55. Designated at 56 is a washer disposed on the bolt between the shoulder 55 and the fishtail member 12. A suitable clamping nut 57 is provided on the end of the bolt, and secured on the bolt between the nut 57 and the body portion 19 of bracket 18 is the end of the fender bracket 58. The arms 33 cooperate with the bearing portion 54 of the bolt 53 to support the axle 16 during vertical reciprocation of the ends of the axle in the slots 26 and to prevent the wheel 15 from becoming canted out of parallelism with respect to the bracket members 18, 18.

As shown in Figures 1 and 4, an additional fender bracket bar 60 may be attached to the rear end portion of each of the bracket members 18.

The provision of the slots 25 in the body portion 19 of the respective bracket members 18 provides a means of adjusting the positions of the bracket members 18 relative to the frame 11 of the bicycle to assure proper chain tension.

While a specific embodiment of an improved spring suspension for the rear wheel of a vehicle, such as a bicycle or the like, has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a bicycle, a frame having parallel rear fishtail portions, a rear wheel disposed between said fishtail portions, a pair of parallel bracket members secured to the respective fishtail portions, said bracket members being formed with vertically extending arcuate slots, an axle rotatably supporting said wheel and extending slidably through said slots, an upstanding link pivotally connected to each end of said axle, an extensible coil spring surrounding each of said links, the top end of each spring being secured to the top end of the associated link and the lower end of each spring being secured to a bracket member, a depending link pivotally connected to each end of the axle, a compressible coil spring surrounding each depending link, the lower end of each compressible spring engaging the lower end of its associated depending link and the upper end of each compressible spring bearing on the associated bracket member, whereby downward movement of the frame relative to the axle will be cushioned by said springs, a pair of arms each having one end thereof pivoted about said axle adjacent opposite ends of said axle, each arm being formed with a slot adjacent the opposite end thereof, and a pair of bolts fixed to said frame at opposite sides thereof, said bolts being received within said slots in said arms and guiding said arms, whereby canting of said axle in said first named slot is prevented.

2. In a bicycle, a frame having parallel rear fishtail portions, a wheel disposed between said fishtail portions, a bracket member including a main body portion and an upstanding arm portion arranged longitudinally of each of said fishtail portions and having the main body portion secured to the adjacent fishtail portion, the upstanding arm portion of each of said bracket members being formed with a vertically extending slot, an axle rotatably supporting said wheel and extending slidably through said slots and having each of its ends projecting beyond the upstanding arm portion of the adjacent bracket member, a sleeve member secured to each of the projecting ends of said axle, an upstanding plate member rotatably supported on each sleeve member, an upstanding link slidably extending through the top of each of the upstanding arm portions of said bracket members and having the lower end connected to the adjacent plate member, an extensible coil spring surrounding and operatively connected to the portion of each of said links exteriorly of the top of the upstanding arm portion of the adjacent bracket member, a second depending link slidably extending through the bottom of each of the upstanding arm portions of said bracket members and having the upper end connected to the adjacent plate member, a compressible spring surrounding and operatively connected to the portion of each of said second links exteriorly of the bottom of the upstanding arm portion of the adjacent bracket member, and an arm supported on each of the projecting ends of said axle for rotation around said axle and slidably connected to the main body portion of the adjacent bracket member.

3. In a bicycle, a frame having parallel rear fishtail portions, a wheel disposed between said fishtail portions, a bracket member including a main body portion and an upstanding arm portion arranged longitudinally of each of said fishtail portions and having the main body portion secured to the adjacent fishtail portion, the upstanding arm portion of each of said bracket members being formed with a vertically extending slot, an axle rotatably supporting said wheel and extending slidably through said slots and having each of its ends projecting beyond the upstanding arm portion of the adjacent bracket member, a sleeve member secured to each of the projecting ends of said axle, an upstanding plate member rotatably supported on each sleeve member, an upstanding link slidably extending through the top of each of the upstanding arm portions of said bracket members and having the lower end connected to the adjacent plate member, an extensible coil spring surrounding and operatively connected to the portion of each of said links exteriorly of the top of the upstanding arm portion of the adjacent bracket member, a second depending link slidably extending through the bottom of each of the upstanding arm portions of said bracket members and having the upper end connected to the adjacent plate member, a compressible spring surrounding and operatively connected to the portion of each of said second links exteriorly of the bottom of the upstanding arm portion of the adjacent bracket member, an arm supported on each of the projecting ends of said axle for rotation around said axle, each arm having a slot, and a bolt fixed to said frame adjacent each of said arms and slidably extending through the slot in the adjacent arm.

WILLIAM M. PRICE.

References Cited in the file of this patent

UNITED STATES PATENTS

| Number | Name | Date |
|---|---|---|
| 712,553 | Lawrence | Nov. 4, 1902 |
| 892,161 | Jennings | June 30, 1908 |
| 1,470,301 | Tappen et al. | Oct. 9, 1923 |
| 2,550,876 | Spencer | May 1, 1951 |

FOREIGN PATENTS

| Number | Country | Date |
|---|---|---|
| 12,606 | Great Britain | of 1905 |